(12) United States Patent
Kopp

(10) Patent No.: US 7,631,655 B1
(45) Date of Patent: Dec. 15, 2009

(54) DISASSEMBLY METHOD FROM A WATER MIXING VALVE OF A HANDLE THEREOF

(76) Inventor: Laurence D. Kopp, 74-B Cuba Hill Rd., Greenlawn, NY (US) 11740

( * ) Notice: Subject to any disclaimer, the term of this patent is extended or adjusted under 35 U.S.C. 154(b) by 450 days.

(21) Appl. No.: 11/708,081

(22) Filed: Feb. 20, 2007

(51) Int. Cl.
*E03C 1/02* (2006.01)
(52) U.S. Cl. ............... 137/15.18; 137/315.15; 137/360
(58) Field of Classification Search ............ 137/315.15, 137/15.17, 15.18, 359, 360; 4/676, 677, 4/678
See application file for complete search history.

(56) References Cited

U.S. PATENT DOCUMENTS

| | | | | |
|---|---|---|---|---|
| 3,167,855 A | * | 2/1965 | Moen | 137/15.17 |
| 3,559,684 A | | 2/1971 | Rudewick | |
| 4,313,350 A | * | 2/1982 | Keller et al. | 251/285 |
| 5,737,422 A | * | 4/1998 | Billings | 713/159 |
| 5,813,431 A | * | 9/1998 | Cool et al. | 137/360 |

* cited by examiner

*Primary Examiner*—Kevin L Lee
(74) *Attorney, Agent, or Firm*—Myron Amer P.C.

(57) ABSTRACT

Exposing through a wall opening of a psychiatric facility stall shower as a plumbing fixture, a water outlet to which is splined an anti-suicide conical handle, wherein the mere unsplining of the handle make accessible for repair the plumbing fixture water outlet.

2 Claims, 2 Drawing Sheets

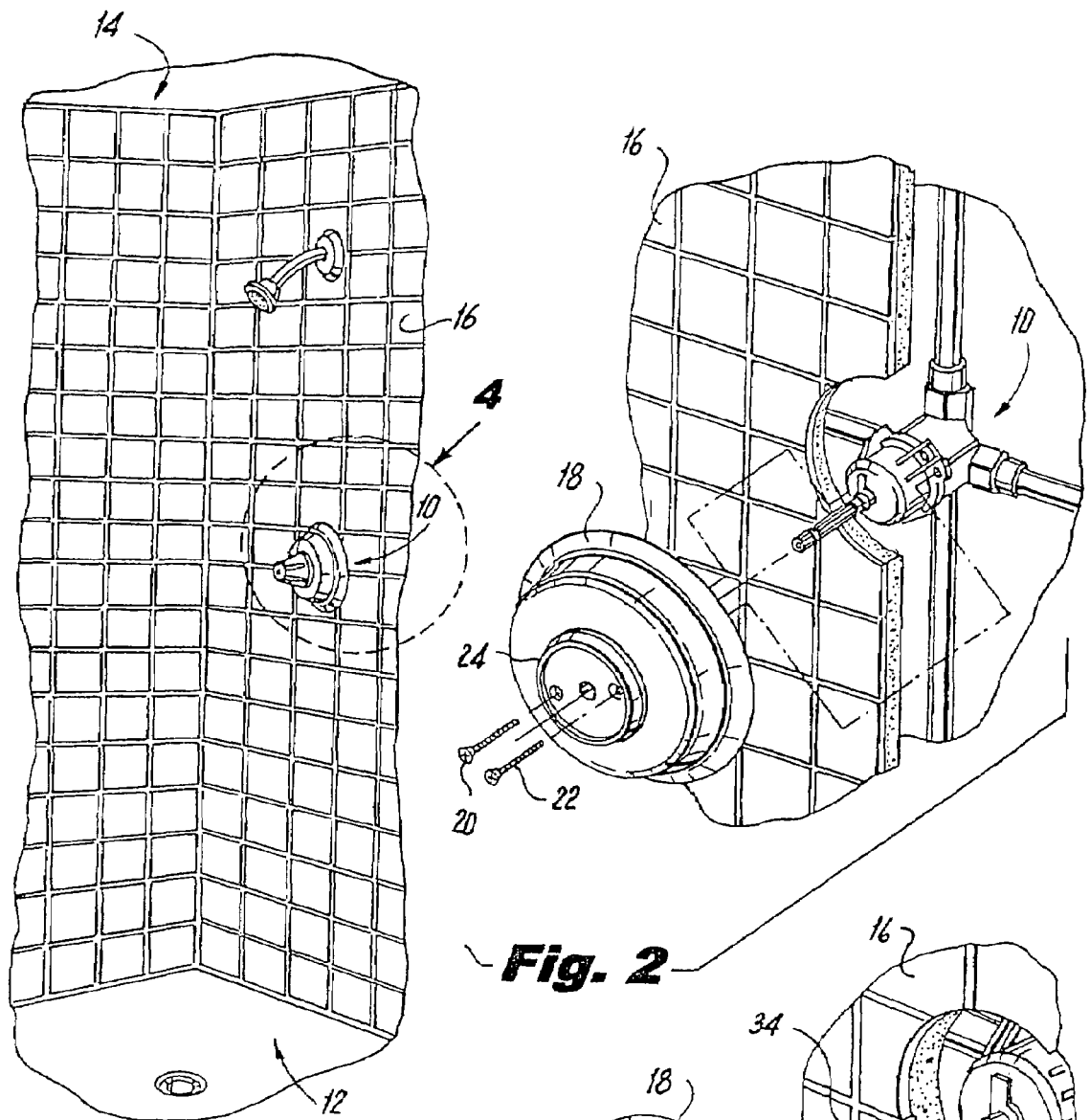

DISASSEMBLY METHOD FROM A WATER MIXING VALVE OF A HANDLE THEREOF

The present invention relates generally to improvements for a water mixing valve for a shower of a psychiatric facility and, more particularly, to rendering the mixing valve accessible to repair without undermining the psychiatric facility's rules for the safe use of the handle of the water mixing valve, all as will be better understood as the description proceeds.

BACKGROUND OF THE INVENTION

1. Field of Search

As background, the focus of the description which follows is on a psychiatric prison or like facility, and used as an example is the problem posed by a closet clothes rod and its being used for attempted, and actually achieved, suicides at such facilities. In U.S. Pat. No. 4,643,318 for "Safety Closet Rod System" issued on Feb. 17, 1987, to this inventor, Laurence D. Kopp, the negating of the closet clothes rod as a suicidal implement is disclosed. Equally foreboding is a handle of a water mixing valve in a stall shower, and the distinctively different problem it poses. The handle is effectively negated as a suicidal implement, but in doing so, a problem is created in being able to provide access to the water mixing valve installed behind the wall of the stall shower to permit maintenance service to be rendered to the valve.

BRIEF SUMMARY OF THE INVENTION

It is an object of the present invention to overcome the foregoing problem of the prior art, namely, the problem of accessibility of the handle of the shower water-mixing for the purpose of making repairs.

More particularly, it is an object to mount the mixing water valve handle to be readily removed for repairs but, in so doing, still negating the improper use of the mixing water valve handle as might consist of clearances in the mounting structure.

BRIEF DESCRIPTION OF THE DRAWINGS

The description of the invention which follows, together with the accompanying drawings should not be construed as limiting the invention to the example shown and described, because those skilled in the art to which this invention appertains will be able to devise other forms thereof.

FIG. 1 is a partial perspective view of a shower stall having a mixing valve of anti-suicide construction requiring access for maintenance provided by the disassembly method of the present invention;

FIG. 2 is a partial perspective view illustrating the mixing valve construction made accessible for maintenance;

FIG. 3 is an exploded view showing further details of the disassembly of FIG. 2;

DETAILED DESCRIPTION OF THE INVENTION

Figure 4:
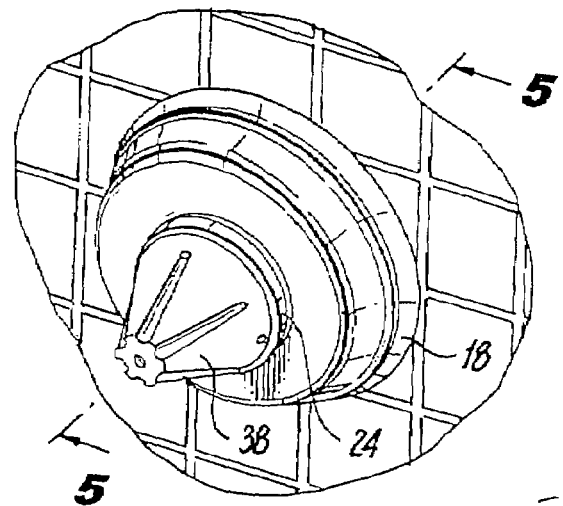
FIG. 4 is an isolated view of the mixing valve circumscribed by the arrow 4 of FIG. 1.
Figure 5:
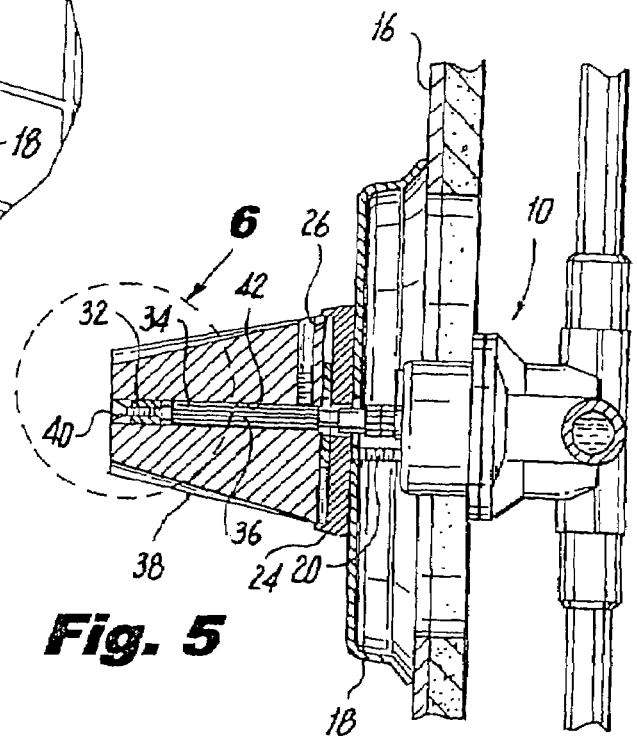
FIG. 5 is a cross-sectional view taken along line 5-5 of FIG. 4.
Figure 6:
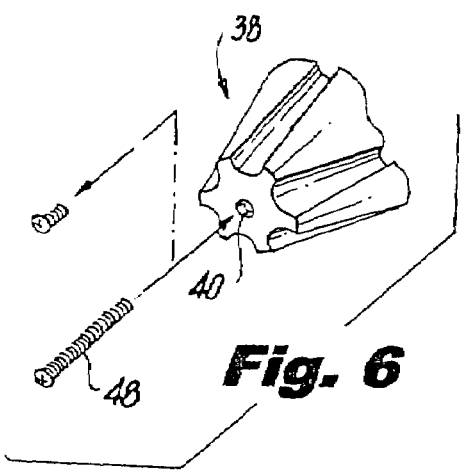
FIG. 6 is an isolated perspective view illustrating an initial step in the within inventive disassembly method.
Figure 7:
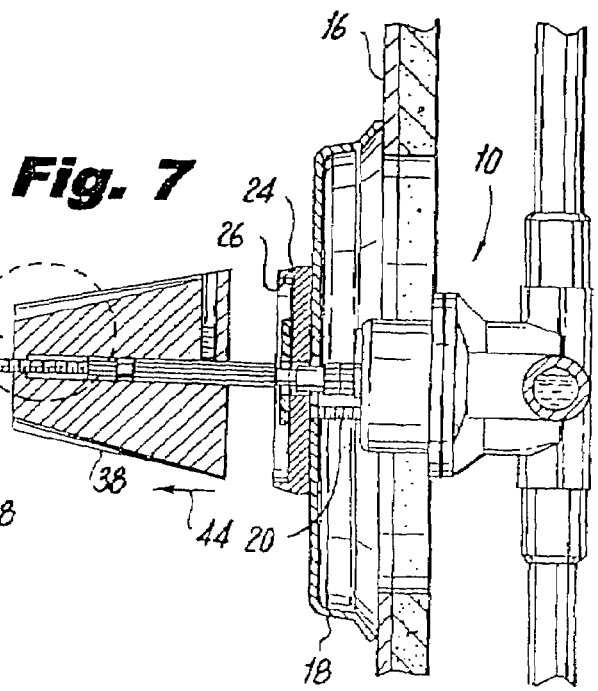
FIG. 7 like FIG. 5 is a structural cross-sectional view, but in FIG. 7 illustrating a subsequent step in the disassembly method of the present invention.
Figure 8:
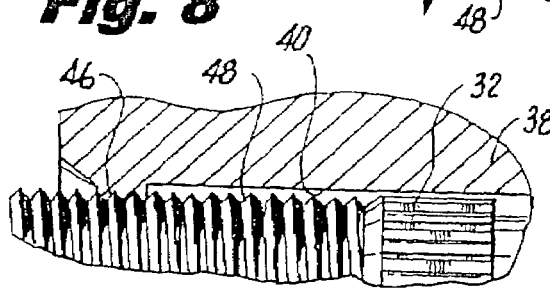
FIG. 8 is a partial isolated view of the portion of the mixing valve circumscribed by the arrow 8 of FIG. 7.

Shown in the drawings is one of many commercially available water mixing valves, the one preferred being patented by Speakman Co. of Wilmington, Del. under U.S. Pat. No. 3,559,684 and which valve is generally designated 10 and shown in its installed condition operatively disposed to operate the water mixing mode of a stall shower 12 of a psychiatric facility 14, a shower stall wall 16 being a support for an external mounting cover plate 18, with two assembly screws 20 and 22 joining the components 18 and 10.

Disposed in covering relation over the screws 20, 22 is a collar 24 with a circular lip 26 which has a centrally located circular opening 28 in alignment with an underlying central opening 30 of the cover plate 18 and through which openings 28, 30 a free end 32 of a horizontally oriented stem 34 of the valve 10 is projected, said projected stem end 32 being, according to the present invention, having a first embodied splining 36 functional in the disassembling method as will be better understood as the description proceeds.

Assembled on the collar 24 and sized to fit within the confines of the lip 26 is an anti-suicidal handle 38, having to this end a conical configuration or shape so as to obviate the engagement about the thusly shaped handle 38 of a noose that can be used in a suicide attempt. The handle 38 is prepared with a central throughbore 40 in the front end of which throughbore there is broached a second embodied splining 42 which is in interengaged relation with the splining 36 of the stem 34 to cause rotation in unison of the handle 38 and stem 34, but by virtue of the embodied splines 36, 42 allowing releasing movement, as noted by the arrow 44, of the handle 38 along the splines 36 of the stem 34.

Completing the machining preparation of the handle 38 is a tapping or threading 46 of the front end of the throughbore 40. Inserted in the threaded throughbore 40 is a backing-off screw 48 which is rotated to a first extent into contact with the valve stem 34 and to a subsequent extent which results in axial movement noted by the arrow 50 which backs the handle 38 off of the collar 24 exposing the assembly screws 20, 22 and the unscrewing of the screws 20, 22 releasing the collar 24 and exposing the water mixing valve 10 which is then rendered maintenance service in its installed condition.

While the water valve mounting structure for practicing the within inventive method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method of disassembling an external anti-suicidal handle on a psychiatric facility shower stall wall to achieve for maintenance access to a water mixing valve behind said wall, the disassembling method comprising the steps of:

A. delivering showering water through plumbing to a site of use in adjacent relation rearwardly of a shower stall wall;

B. attaching a water mixing valve having a horizontally oriented stem disposed for rotation to operate a water-mixing mode of said valve;

C. splining firstly on a free end of said stem projected through an opening of a shower stall wall;

D. using a circular cover plate having a central opening for receiving in projected relation therethrough said splined valve stem;

E. threadable engaging with rearwardly oriented assembly screws said circular plate to said water mixing valve;

F. covering over said assembly screws with a collar to prevent access thereto to contribute to enhancing the anti-suicidal value of a final assembly of a handle to said water mixing valve;

G. using an anti-suicidal handle having a conical configuration contributing to obviating an attachment of a suicide-abetting noose to said handle;

H. drilling a throughbore in a medial location in said handle;

I. splining secondarily on a rear end of said handle throughbore so said second splining is interengagable with said first splining effective to provide rotative movement while allowing a releasing axial movement therebetween;

J. threadably machining a front end of said handle throughbore;

K. threadably engaging with a back-off screw said threaded front end of said handle; and L. rotating said back-off screw to a first extent into contact with said splined valve stem and in a subsequently continuing extent to cause axial movement of said second splines in releasing movement along said first splines;

whereby said handle is in a clearance position separated from said collar to contribute to providing access to exposed said assembly screws therein and the ready removal of said assembly screws preparatory to providing maintenance service to said water mixing valve.

2. A method of preliminarily assembling and subsequently disassembling an external anti-suicidal handle on a psychiatric facility shower stall wall to achieve for maintenance access to a water mixing valve behind said wall, the preliminary assembling method comprising the steps of:

A. delivering showering water through plumbing to a site of use in adjacent relation rearwardly of a shower stall wall;

B. splining firstly on a free end of a stem projected through an opening of a shower stall wall;

C. using a circular cover plate having a central opening for receiving in projected relation therethrough said splined valve stem;

D. drilling a throughbore in a medial location in said handle;

E. splining secondarily on a rear end of said handle throughbore so said second splining is interengagable with said first splining effective to provide rotative movement while allowing a releasing axial movement therebetween; and F. threadably machining a front end of said handle throughbore and the subsequently disassembling method comprising the steps of:

G. attaching a water mixing valve having a horizontally oriented stem disposed for rotation to operate a water-mixing mode of said valve;

H. threadable engaging with rearwardly oriented assembly screws said circular plate to said water mixing valve;

I. covering over said assembly screws with a collar to prevent access thereto to contribute to enhancing the anti-suicidal value of a final assembly of a handle to said water mixing valve;

J. threadably engaging with a backing-off screw said threaded front end of said handle; and K. rotating said backing-off screw to a first extent into contact with said splined valve stem and in a subsequently continuing extent to cause axial movement of said second splines in releasing movement along said first splines;

whereby said handle is in a clearance position separated from said collar to contribute to providing access to exposed said assembly screws therein and the ready removal of said assembly screws preparatory to providing maintenance service to said water mixing valve.

* * * * *